(12) United States Patent
Shahana

(10) Patent No.: US 6,848,336 B2
(45) Date of Patent: Feb. 1, 2005

(54) BICYCLE SHIFT CONTROL DEVICE BIASED TO A NEUTRAL POSITION

(75) Inventor: Satoshi Shahana, Osaka (JP)

(73) Assignee: Shimano, Inc., Sakai (JP)

( * ) Notice: Subject to any disclaimer, the term of this patent is extended or adjusted under 35 U.S.C. 154(b) by 80 days.

(21) Appl. No.: 10/190,462

(22) Filed: Jul. 5, 2002

(65) Prior Publication Data

US 2004/0005945 A1 Jan. 8, 2004

(51) Int. Cl.[7] ................................. F16C 1/22
(52) U.S. Cl. ................ 74/502.6; 74/489; 74/501.6; 74/506
(58) Field of Search .................. 79/501.6, 489, 79/506, 502.2, 527, 473.14, 473.13

(56) References Cited

U.S. PATENT DOCUMENTS

| | | | |
|---|---|---|---|
| 3,856,123 A | * 12/1974 | Kinsey ................. | 74/506 |
| 5,020,387 A | 6/1991 | Nagano | |
| 5,358,451 A | 10/1994 | Lacombe et al. | |
| 5,479,776 A | 1/1996 | Romano | |
| 5,618,241 A | 4/1997 | Ose | |
| 6,467,368 B1 | * 10/2002 | Feng et al. ........... | 74/501.6 |
| 6,644,143 B2 | * 11/2003 | Feng et al. ........... | 74/502.2 |

FOREIGN PATENT DOCUMENTS

| | | |
|---|---|---|
| DE | 197 02 788 A2 | 7/1998 |
| EP | 509457 A1 | 10/1992 |
| EP | 523257 A1 | 1/1993 |
| FR | 2657062 A1 | 7/1991 |

* cited by examiner

Primary Examiner—David A. Bucci
Assistant Examiner—Bradley J. Van Pelt
(74) Attorney, Agent, or Firm—James A. Deland

(57) ABSTRACT

A shift control device is provided for controlling a transmission control member coupled to a bicycle transmission. The device comprises an actuating component that is manually operated by a rider, wherein the actuating component moves to an actuating component neutral position, to an actuating component upshift position and to an actuating component downshift position. A first biasing component biases the actuating component toward one of the upshift position and the downshift position, and a neutral positioning component positions the actuating component in a neutral position. A transmission control member coupling component is adapted to couple the transmission control member to the actuating component such that the transmission control member moves to a transmission control member neutral position when the actuating component moves to the actuating component neutral position, to a transmission control member upshift position when the actuating component moves to the actuating component upshift position, and to a transmission control member downshift position when the actuating component moves to the actuating component downshift position.

30 Claims, 21 Drawing Sheets

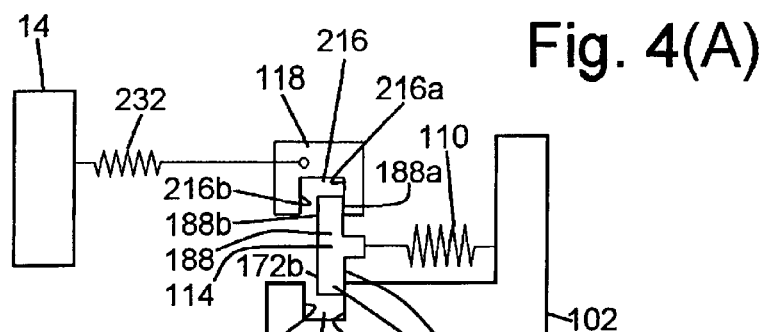
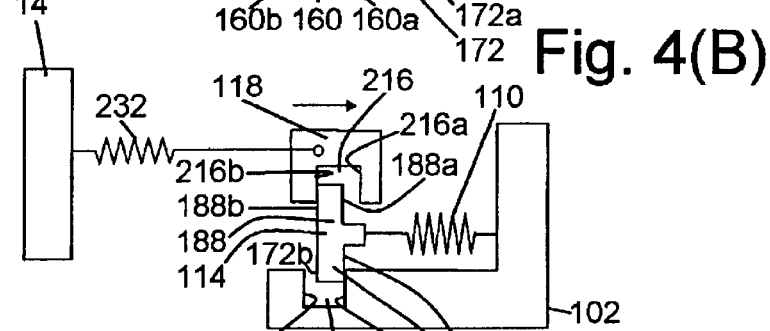
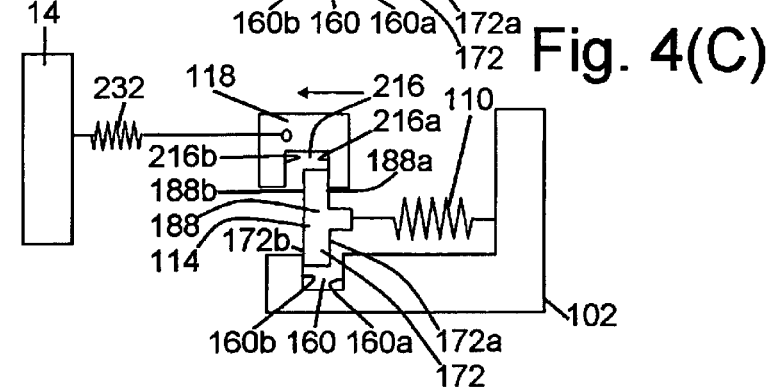

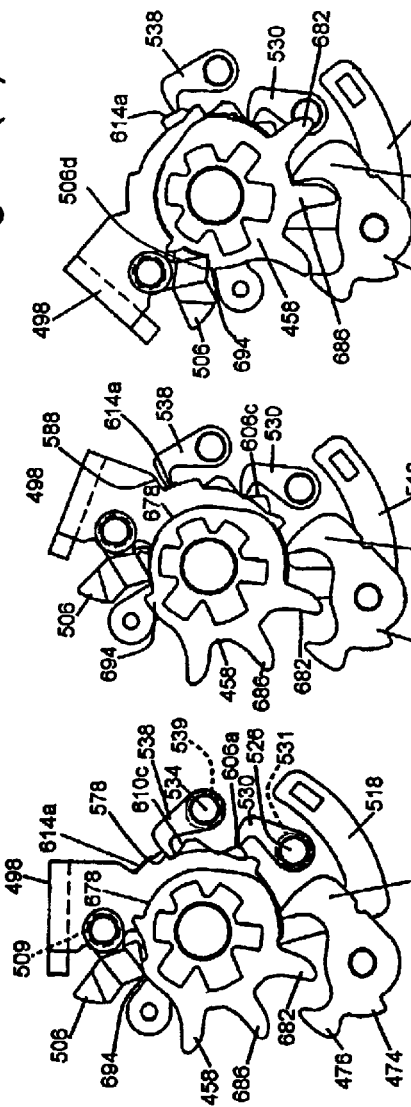
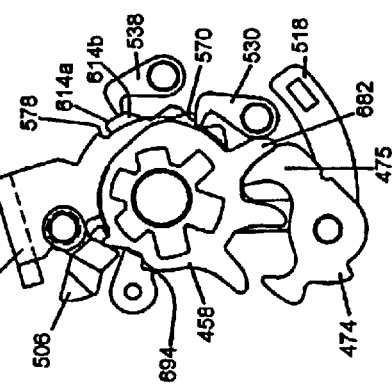
Fig. 16(A) Fig. 16(B) Fig. 16(C) Fig. 16(D) Fig. 16(E)

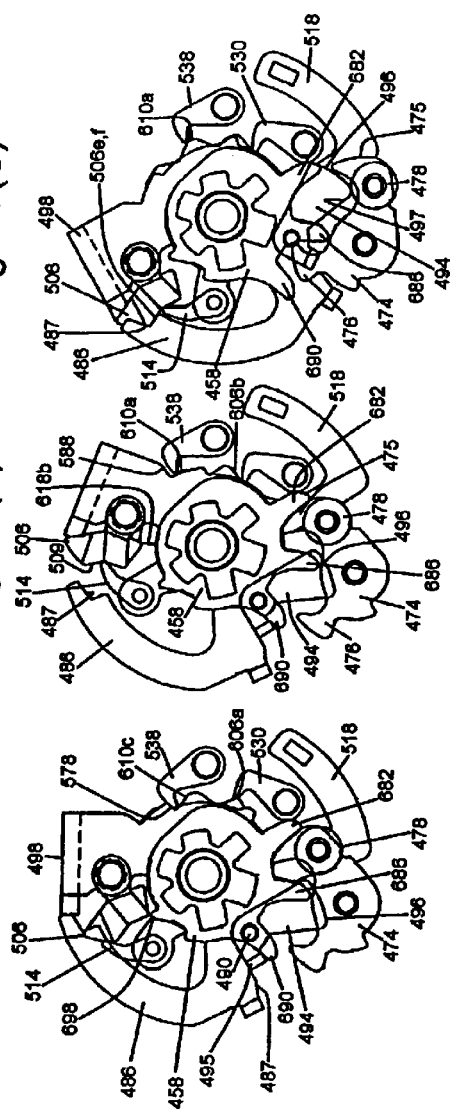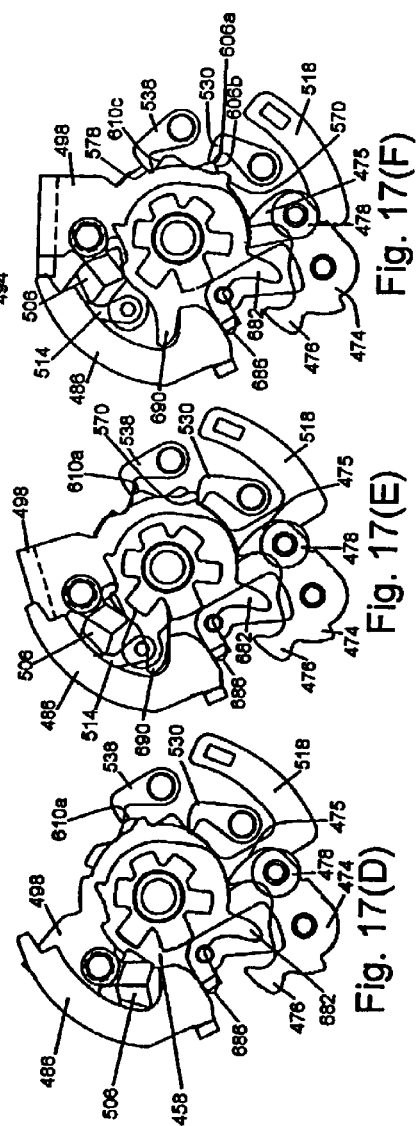

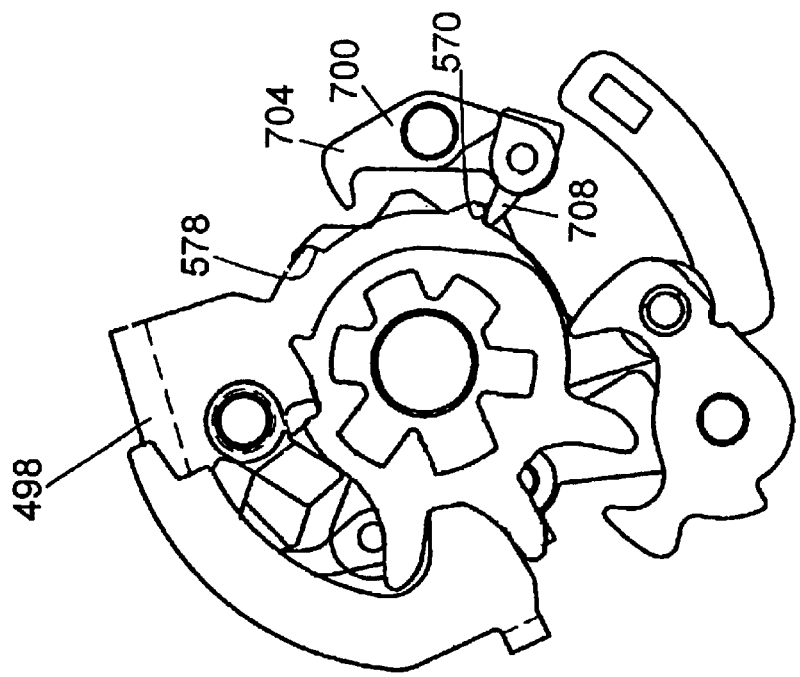
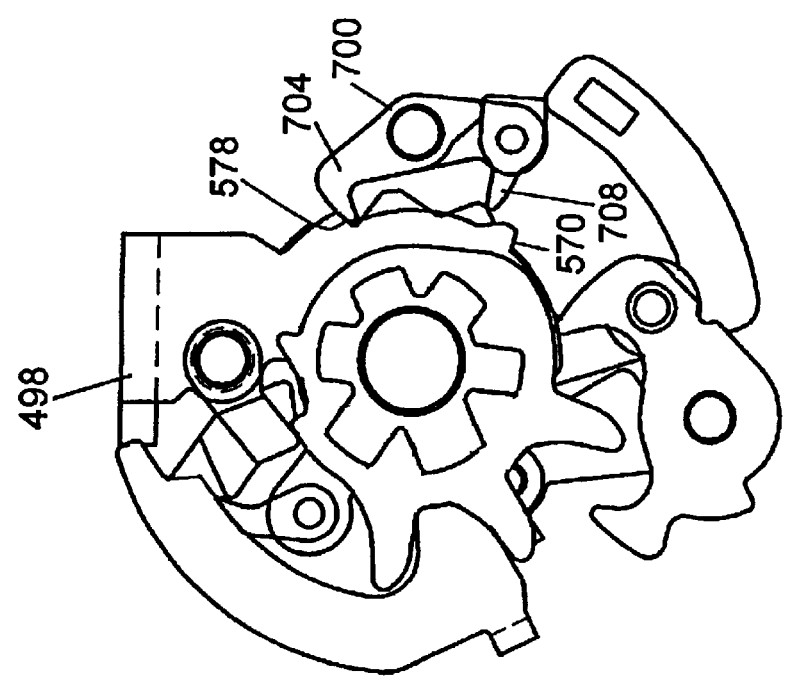

BICYCLE SHIFT CONTROL DEVICE BIASED TO A NEUTRAL POSITION

BACKGROUND OF THE INVENTION

The present invention is directed to bicycle transmissions and, more particularly, to an apparatus for assisting a change speed operation in the bicycle transmission.

Various devices have been developed to help reduce the effort needed to operate bicycle transmissions such as derailleurs and internal hub transmissions. Examples of such devices particularly suited to assist the operation of derailleur transmissions are shown in U.S. Pat. No. 5,358, 451. The devices shown therein for assisting the operation of a rear derailleur employ multiple moving parts that are in constant motion, thus increasing the amount of moving mass as well as the possibility of premature wear on the components. Devices shown therein for assisting the operation of a front derailleur accommodate only two front sprockets. However, many bicycles have more than two front sprockets. Thus, there is a desire for an assist device that can be used with more than two sprockets.

Many shift control devices also have been developed to control the operation of bicycle transmissions. Such shift control devices ordinarily take the form of levers or cylindrical twist-grips that rotate to a different position for each gear position. Some shift control devices used with electrically operated transmissions have the form of buttons that are pressed by the rider. A lever that rotates to different positions requires the rider to reach to a different position for each gear in order to operate the lever, and this can be distracting during high performance riding. A twist grip does not produce such variable positioning, but the twist grip must be encircled by the hand to be operated, thus requiring a substantial amount of effort. Buttons have the disadvantage of being counterintuitive, and they require more effort to locate.

SUMMARY OF THE INVENTION

The present invention is directed to various features of an apparatus for assisting a speed change operation in a bicycle transmission. Like prior art devices, the apparatus can accommodate two front sprockets, but the apparatus also can accommodate more than two front sprockets. The apparatus also provides a shift control device that is easy to operate in an intuitive manner.

In one feature of the present invention, an assisting apparatus for using power from a rotating member to assist the operation of a bicycle transmission includes a mounting unit; an input transmission member coupled to the mounting unit, wherein the input transmission member moves to at least a neutral position, to an upshift position and to a downshift position; and an output transmission member coupled to the mounting unit, wherein the output transmission member moves to at least a first output position and a second output position. A rotating member engaging member moves between a rotating member engaging position and a rotating member disengaging position, and a motion transmitting mechanism transmits motion from the rotating member engaging member to the output transmission member. A switching mechanism moves the rotating member engaging member to the rotating member engaging position when the input transmission member is in at least one of the upshift position and the downshift position.

In another feature of the present invention, an assisting apparatus for using power from a rotating member to assist the operation of a bicycle transmission comprises a mounting unit; an input transmission member coupled to the mounting unit, wherein the input transmission member moves between at least a first input position and a second input position; and an output transmission member coupled to the mounting unit, wherein the output transmission member moves between at least a first output position and a second output position. A rotating member engaging member moves between a rotating member engaging position and a rotating member disengaging position, and a motion transmitting mechanism transmits motion from the rotating member engaging member to the output transmission member. A switching mechanism moves the rotating member engaging member to the rotating member engaging position when the input transmission member is in the second input position, moves the rotating member engaging member to the rotating member disengaging position when the output transmission member moves from the first output position to the second output position, and prevents the rotating member engaging member from returning to the rotating member engaging position until the input transmission member moves away from the second input position. This feature has many advantages, such as allowing the apparatus to be operated to produce a single speed change without requiring the rider to move the input transmission member back to the home position.

In another feature of the present invention which can be used in environments other than those which use power from a rotating member to assist the operation of a bicycle transmission, a bicycle control device includes a mounting unit; an output transmission member coupled to the mounting unit, wherein the output transmission member moves between at least a first output position and a second output position; a position maintaining mechanism including a position maintaining member that moves between a position maintaining position and a position release position, wherein the position maintaining position maintains the output transmission in one of the first output position and the second output position, and wherein the position release position allows the output transmission member to move toward the other one of the first output position and the second output position; a release drive member coupled to the mounting unit, wherein the release drive member moves between at least a first release drive position and a second release drive position; and a release control mechanism including a release member that moves from a first release member position toward a second release member position when the release drive member moves from the first release drive position toward the second release drive position, wherein the release control mechanism moves the position maintaining member to the position release position as the release member moves toward the second release member position and allows the position maintaining member to return to the position maintaining position as the release member continues to move toward the second release member position.

In another feature of the present invention, a shift control device is provided for controlling a transmission control member coupled to a bicycle transmission. The device comprises an actuating component that is manually operated by a rider, wherein the actuating component moves to an actuating component neutral position, to an actuating component upshift position and to an actuating component downshift position. A first biasing component biases the actuating component toward one of the upshift position and the downshift position, and a neutral positioning component positions the actuating component in a neutral position. A transmission control member coupling component is adapted to couple the transmission control member to the actuating component such that the transmission control member moves to a transmission control member neutral position when the actuating component moves to the actuating component neutral position, to a transmission control member upshift position when the actuating component moves to the actuating component upshift position, and to a transmission control member downshift position when the actuating component moves to the actuating component downshift position.

BRIEF DESCRIPTION OF THE DRAWINGS

FIGS. 4(A)–4(C) are schematic views showing the operation of the shift control device;

FIGS. 16(A)–(E) are views illustrating the operation of the assist mechanism in an upshifting direction;

FIGS. 17(A)–(F) are views illustrating the operation of the assist mechanism in a downshifting direction;

FIGS. 19(A) and 19(B) are views of an alternative embodiment of a drive control mechanism according to the present invention.

DETAILED DESCRIPTION OF THE EMBODIMENTS

Figure 1:
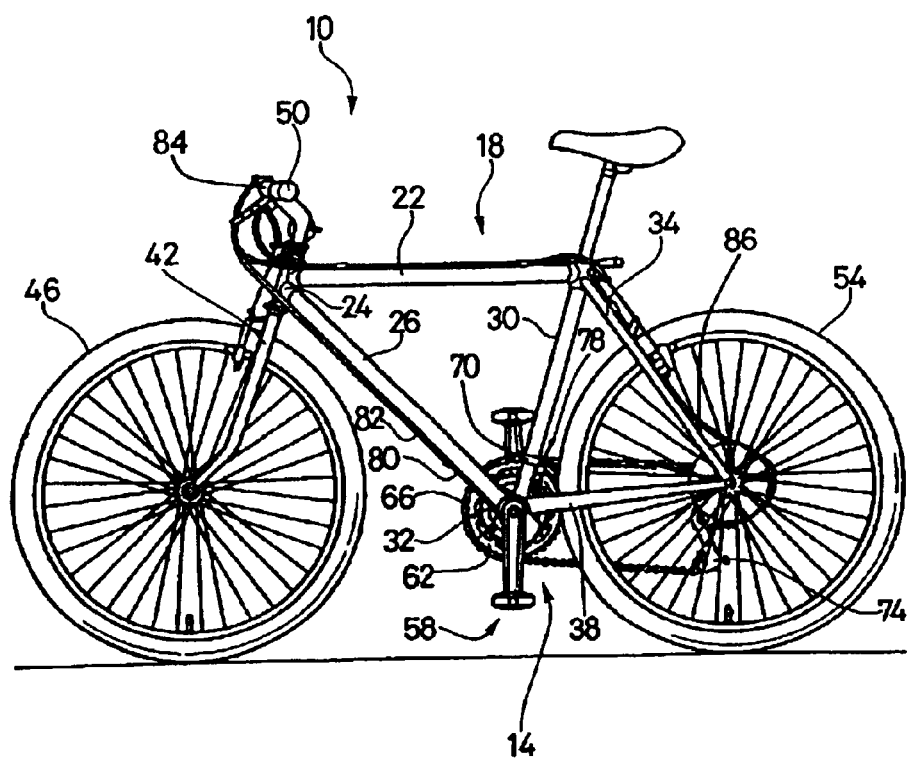
FIG. 1 is a side view of a particular embodiment of a bicycle that incorporates an apparatus according to the invention for assisting a speed change operation in a bicycle transmission.

FIG. 1 is a side view of a bicycle 10 that incorporates a particular embodiment of an assist mechanism 14 according to the invention for assisting a change speed operation in a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 extending downwardly from top tube 22, a bottom bracket 32 disposed at the junction of down tube 26 and seat tube 30, a pair of seatstays 34 extending rearwardly and downwardly from top tube 22, and a pair of chainstays 38 extending rearwardly from bottom bracket 32. A fork 42 is rotatably supported within head tube 24, and a front wheel 46 is rotatably supported to the lower end of fork 42. The rotational direction of fork 42 and wheel 46 is controlled by a handlebar 50 in a well known manner. A rear wheel 54 having a plurality of coaxially mounted freewheel sprockets (not shown) is rotatably supported at the junction of seatstays 34 and chainstays 38, and a pedal assembly 58 supporting a plurality of front (chainwheel) sprockets 62 is rotatably supported within bottom bracket 32. In this embodiment, three front sprockets 62 rotate coaxially and integrally with pedal assembly 58. A chain 66 engages one of the plurality of front sprockets 62 and one of the plurality of freewheel sprockets mounted to rear wheel 54. A front derailleur 70 moves chain 66 from one front sprocket 62 to another, and a rear derailleur 74 moves chain 66 from one freewheel sprocket to another. Both operations are well known. In this embodiment, front derailleur 70 is controlled by pulling and releasing an output control wire 78 coupled to assist mechanism 14, and assist mechanism 14 is controlled by an inner wire 80 of a Bowden-type control cable 82 connected to a shift control device 84 mounted to the left side of handlebar 50. Rear derailleur 74 is controlled by a Bowden-type control cable 86 in a conventional manner.

Figure 2:
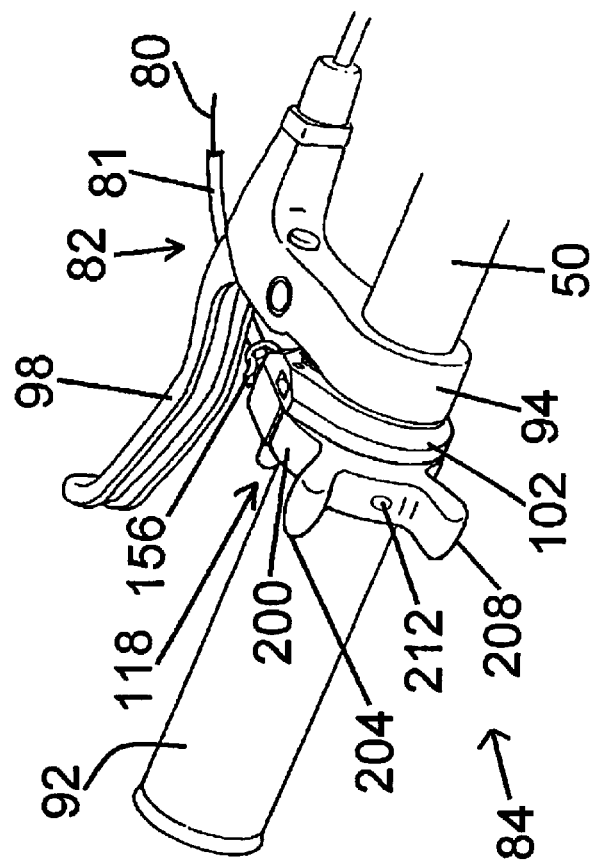
FIG. 2 is a more detailed view of the shift control device.
Figure 3:
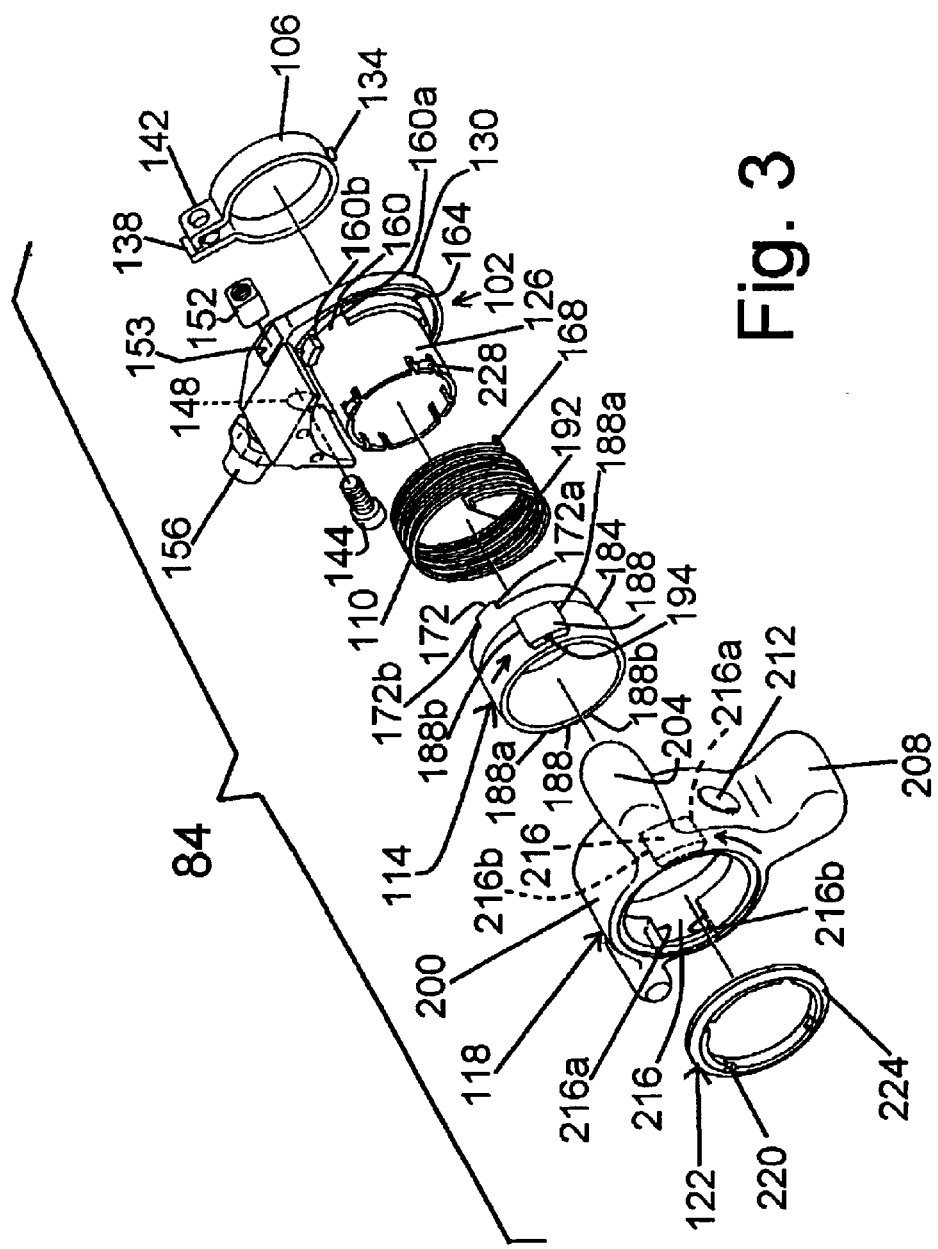
FIG. 3 is an exploded view of the shift control device shown in FIG. 2.

FIG. 2 is a view of the left side of handlebar 50 showing shift control device 84 in more detail, and FIG. 3 is an exploded view of shift control device 84. In this embodiment, shift control device 84 is mounted between a stationary handgrip 92 and a conventional brake lever bracket 94 that supports a brake lever 98. Shift control device 84 comprises a base member 102, a clamping band 106, a biasing component in the form of a spring 110, an intermediate member 114, an actuating component 118, and a retainer 122. Base member 102 comprises a tubular portion 126 and a flange portion 130. Tubular portion 126 surrounds handlebar 50, and flange portion 130 extends radially outwardly from an inner end of tubular portion 126. Clamping band 106 has a locking projection 134 and mounting ears 138 and 142, and the structure fits within an annular recess (not shown) with a locking groove formed at the inner peripheral surface of flange portion 130. A screw 144 extends through an opening 148 in flange portion 130 and through mounting ears 138 and 142 and screws into a nut 152 disposed in another opening 153 in flange portion 130 to tighten mounting ears 138 and 142 toward each other and thereby tighten clamping band 106 and fasten base member 102 to handlebar 50. A conventional screw-type adjustable control cable coupler 156 is disposed on flange portion 130 for receiving the outer casing 81 of control cable 82 in a conventional manner. Diametrically opposed recesses 160 (only one is visible in FIG. 3) having abutments 160a and 160b are formed at the junction of tubular portion 126 and flange portion 130, and a base member bias engaging component 164 in the form of a spring hole is formed in flange portion 130. An end 168 of spring 110 is fitted within spring hole 164.

Intermediate member 114 is rotatably supported on tubular portion 126 of base member 102 such that spring 110 is disposed between intermediate member 114 and flange portion 130 of base member 102. Diametrically opposed projections or stoppers 172 (only one is visible in FIG. 3) forming abutments 172a and 172b extend axially from the inner end of intermediate member 114, and a pair of diametrically opposed intermediate member projections or stoppers 188 forming abutments 188a and 188b extend radially outwardly from an outer peripheral surface 184 of intermediate member 114. An end 192 of spring 110 is fitted within a spring opening 194 (which functions as an intermediate member bias engaging component) formed in one of the stoppers 188 for biasing intermediate member 114 clockwise. As a result, abutments 172a of stoppers 172 engage abutments 160a (which function as base member stoppers) to limit the rotation of intermediate member 114 relative to base member 102.

Actuating component 118 is rotatably supported by intermediate member 114 which, as noted above, is rotatably supported by the tubular portion 126 of base member 102. Thus, actuating component 118 rotates coaxially around intermediate member 114, tubular portion 126 of base member 102, and handlebar 50. Actuating component 118 comprises a tubular member 200, first and second finger projections or levers 204 and 208 extending radially outwardly from tubular member 200, a transmission control member coupling component in the form of an opening 212 for receiving a cable end bead (not shown) attached to the end of inner wire 80 so that inner wire 80 moves integrally with actuating component 114, and diametrically opposed recesses 216 forming abutments 216a and 216b. In the assembled state, intermediate member stoppers 188 are fitted within the corresponding recesses 216 between abutments 216a and 216b so that abutments 216a and 216b function as actuating member stoppers. In this embodiment, inner wire 80 of control cable 82 is under tension as a result of a biasing component disposed in assist apparatus 14. Thus, actuating component 118 is biased in the counterclockwise direction such that abutments 188a of intermediate member stoppers 188 engage abutments 216a to limit the rotation of actuating component 118 relative to intermediate member 114 and base member 102.

Retainer 122 is fitted around the outer end of tubular member 126 of base member 102. Retainer 122 includes four recesses 220 that are evenly formed on a side surface 224 for engaging four locking tabs 228 that extend radially outwardly from the outer end of tubular portion 126 of base member 102. Thus, retainer 122 axially fixes actuating component 118 and intermediate member 114 in place on base member 102.

FIGS. 4(A)–4(C) schematically illustrate the operation of shift control device 84. FIG. 4(A) shows actuating component 118 in an actuating component neutral position. In this position, spring 110 biases intermediate member 114 clockwise (to the right in FIG. 4(A)) so that abutments 172a of stoppers 172 contact abutments 160a of recesses 160 on base member 102, and a biasing component (spring) in assist mechanism 14, indicated by reference number 232, biases actuating component 118 counterclockwise so that abutments 216a of recesses 216 contact abutments 188a of intermediate member stoppers 188. Thus, abutments 160a, 172a, 188a and 216a (and to some extent springs 110 and 232) function as neutral positioning components. Since inner wire 80 is directly coupled to actuating component 118, inner wire 80 likewise is in a transmission control member neutral position at this time.

Rotating actuating component 118 clockwise from the position shown in FIG. 4(A) against the biasing force of the biasing component 232 in assist mechanism 14 causes abutments 216b on actuating component 118 to contact abutments 188b on intermediate member stopper 188 as shown in FIG. 4(B). Intermediate member 114 remains stationary at this time. In FIG. 4(B), actuating component 118 is in an actuating component downshift position, and inner wire 80 is pulled into a transmission control member downshift position.

Rotating actuating component 118 counterclockwise from the position shown in FIG. 4(A) causes intermediate member 114 to rotate counterclockwise (to the left in FIG. 4(C)) against the biasing force of spring 110, since abutments 216a contact abutments 188a of intermediate member stoppers 188 and spring 110 is ultimately coupled between actuating component 118 and base member 102. As a result, actuating component 118 is in an actuating component upshift position, and inner wire 80 is released into a transmission control member upshift position.

Figure 5:
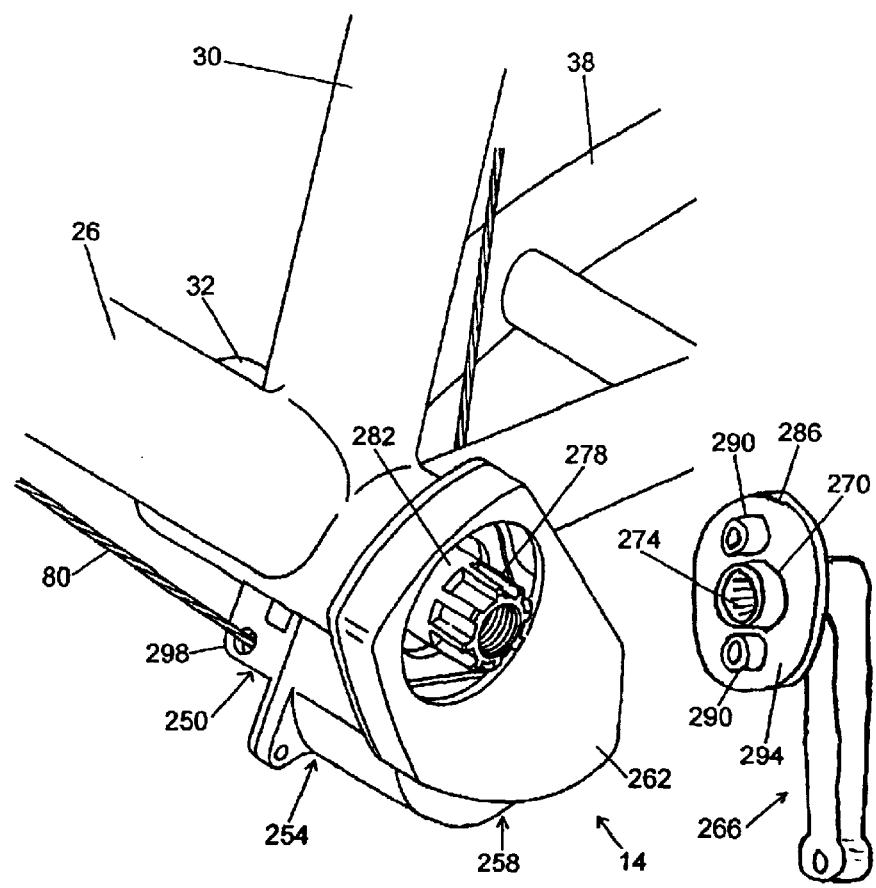
FIG. 5 is a closer view of the assist mechanism shown in FIG. 1.

FIG. 5 is a more detailed view of assist mechanism 14. As shown in FIG. 5, assist mechanism 14 is mounted to bottom bracket 32, and it includes an input unit 250, a positioning unit 254, and a rotating member engaging unit 258 with a cover 262. In this embodiment, assist mechanism 14 is used in conjunction with a crank arm 266 that includes an axle mounting boss 270 having a plurality of crank arm splines 274 that nonrotatably engage a plurality of axle splines 278 formed on the end of an axle 282 that is rotatably supported by bottom bracket 32 in a well known manner. A drive flange 286 extends radially outwardly from axle mounting boss 270 and supports a pair of diametrically opposed drive members 290. Drive members 290 have the shape of circular tubes that extend perpendicularly from the side surface 294 of drive flange 286.

Figure 6:
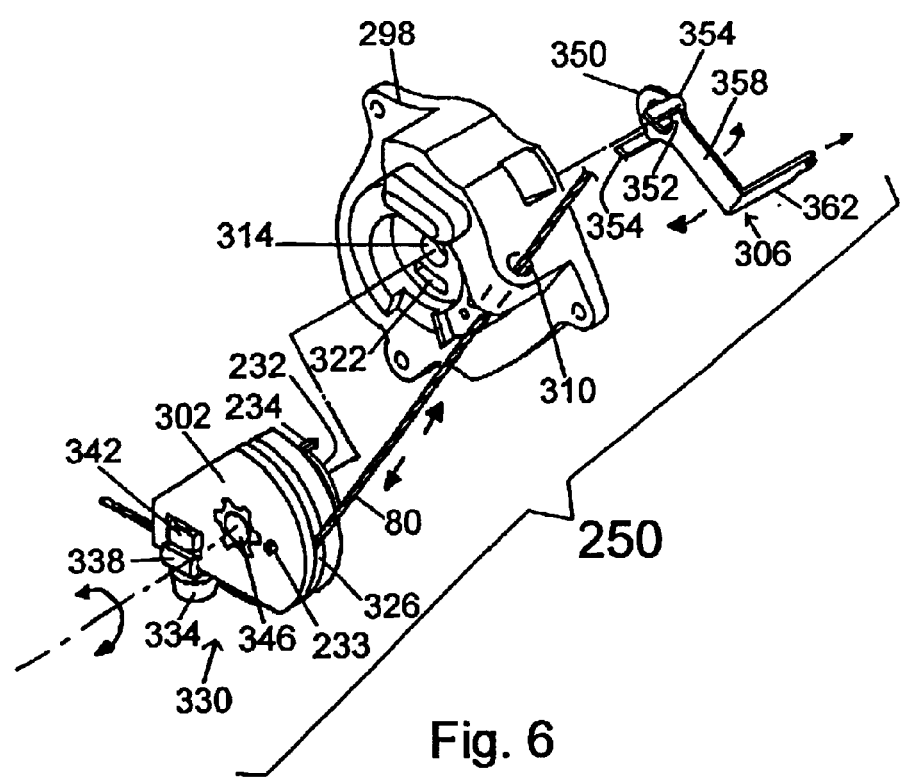
FIG. 6 is an exploded view of a particular embodiment of an input unit according to the present invention.

FIG. 6 is an exploded view of a particular embodiment of input unit 250. Input unit 250 includes an input unit mounting member 298, a wire coupling member 302, spring 232, and an input link 306. Input unit mounting member 298 has a guide channel 310 for inner wire 80, a central axle opening 314 for receiving an axle 318 (FIG. 10) of positioning unit 254 therethrough, and a pair of diametrically opposed openings 322 (only one opening is visible in FIG. 6). Wire coupling member 302 includes a wire winding groove 326 for winding and unwinding inner wire 80, a conventional wire coupler 330 in the form of a screw 334, a wire retainer 338 and a nut 342 for fixing inner wire 80 to wire coupling member 302, and an axle opening 346 for receiving axle 318 of positioning unit 254. Input link 306 functions to communicate the rotational position of wire coupling member 302 to positioning unit 254, and it includes an axle mounting portion 350 with an axle receiving opening 352, coupling tabs 354, a radially extending portion 358, and an axially extending coupling portion 362. Coupling tabs 354 extend axially from axle mounting portion 350, through openings 322 in input unit mounting member 298, and into corresponding openings (not shown) in wire coupling member 302 so that wire coupling member 302 and input link 306 rotate as a unit. Thus, both wire coupling member 302 and input link 306 will assume neutral, upshift and downshift positions corresponding to the positions of actuating component 118 of shift control device 84. Spring 232 has one end 233 mounted to wire coupling member 302 and another end 234 mounted to input unit mounting member 298 so that wire coupling member 302 and input link 306 are biased in the clockwise (wire winding) direction.

Figure 7:
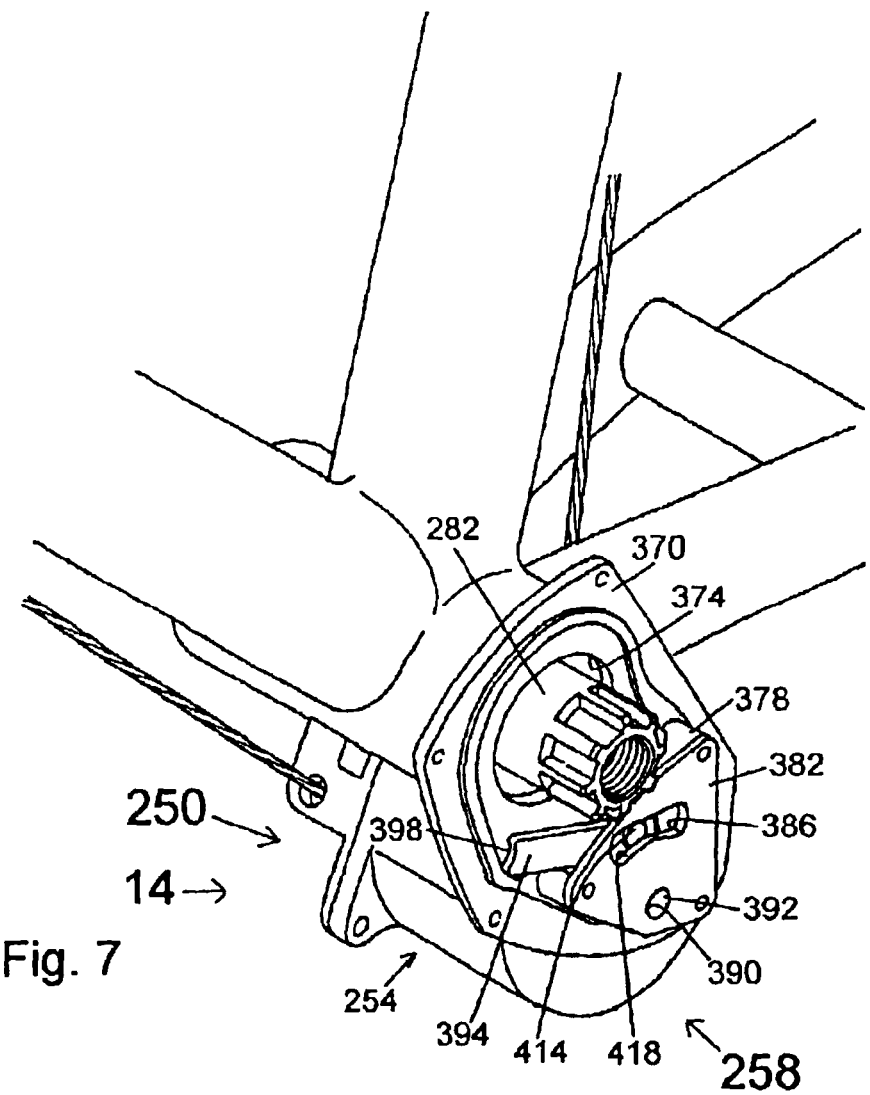
FIG. 7 is a view of the assist mechanism showing a particular embodiment of a rotating member engaging unit.
Figure 8:
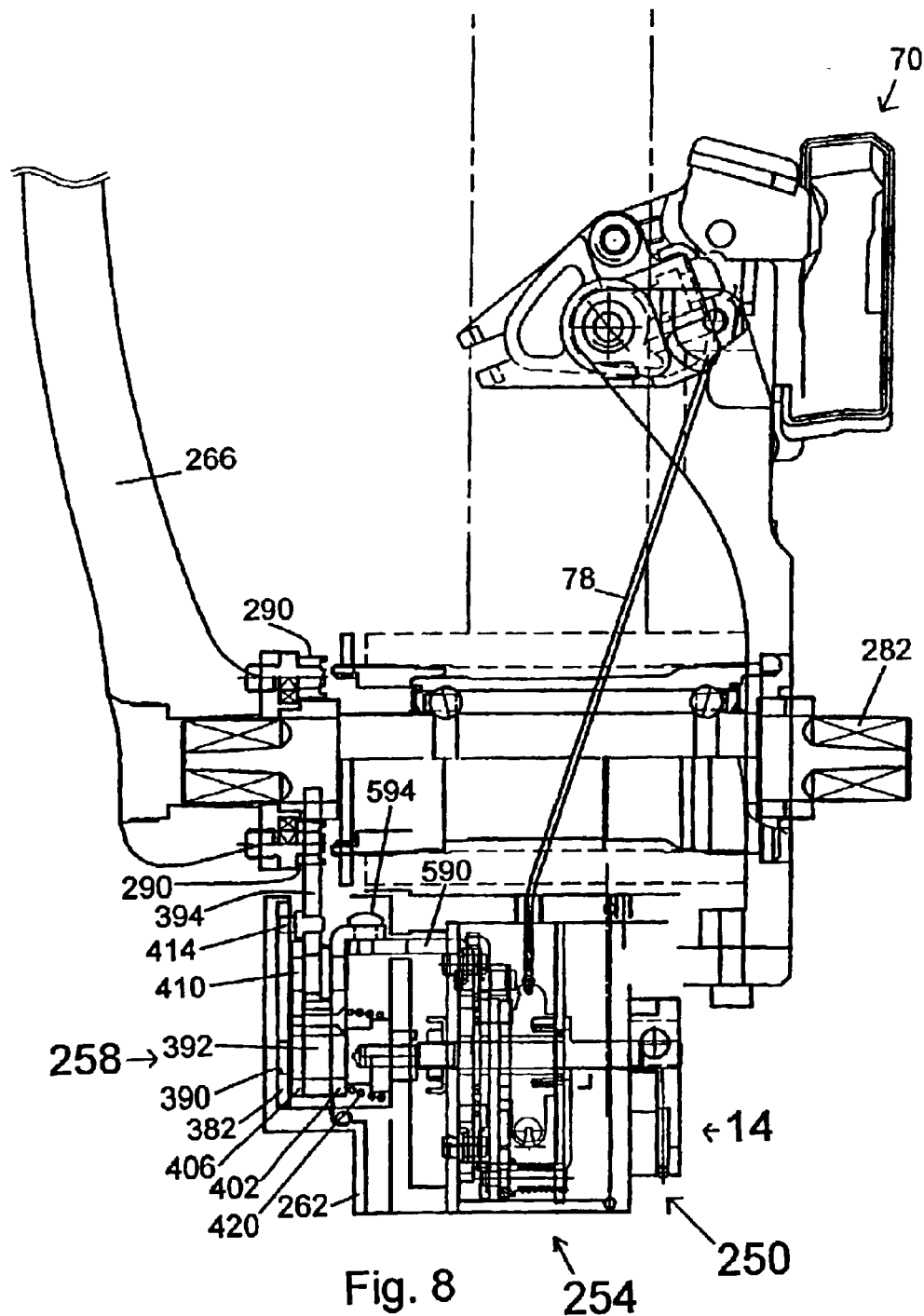
FIG. 8 is a rear cross sectional view of the assist mechanism.
Figure 9A:
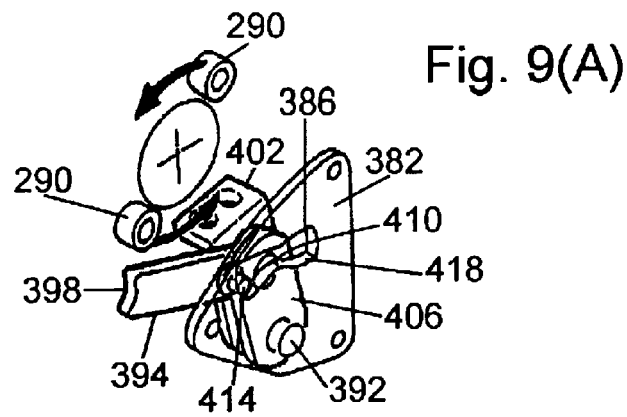
FIGS. 9(A)–9(D) illustrate the operation of the rotating member engaging member.

FIG. 7 is an oblique view of assist mechanism 14 with cover 262 of rotating member engaging unit 258 removed, FIG. 8 is a rear cross sectional view of assist mechanism 14, and FIGS. 9(A)–9(D) illustrate the operation of rotating member engaging unit 258. As shown in FIGS. 7, 8 and 9(A), rotating member engaging unit 258 includes a bottom bracket mounting member 370 with an opening 374 for receiving axle 282 therethrough, an axially extending side wall 378, a cam plate 382 with a control cam slot 386 attached to side wall 378, and an opening 390 for supporting a lower pivot shaft 392. One end of a rotating member engaging member 394 has an arcuate rotating member engaging surface 398 for engaging drive members 290 on crank arm 266. The other end of rotating member engaging member 394 is pivotably connected between a positioning unit interface plate 402 and a support plate 406 by a pivot shaft 410. A cam follower 414 that engages a control cam surface 418 formed by cam slot 386 is mounted to rotating member engaging member 394 in close proximity to pivot shaft 410. A spring 420 biases positioning unit interface plate 402 and support plate 406 in a counterclockwise direction.

Figure 9B:
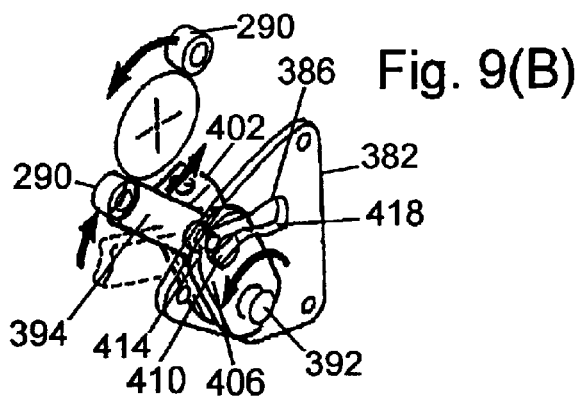
Figure 9C:
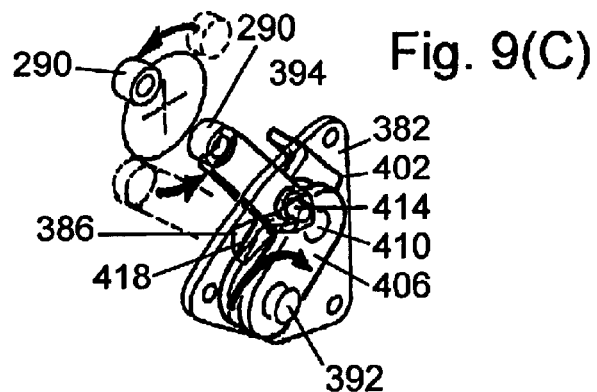
Figure 9D:
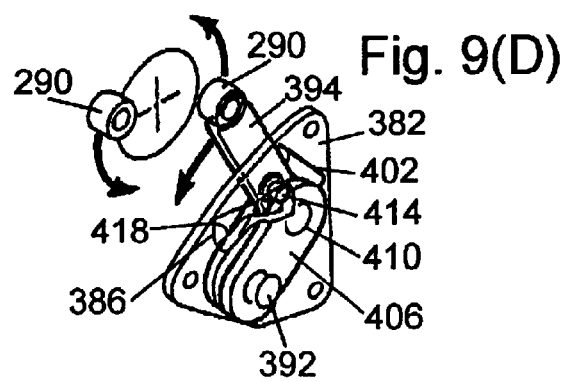

FIG. 9(A) shows rotating member engaging member 394 in a rotating member disengaging position, wherein drive members 290 rotate with crank arm 266 without causing any effect on assist mechanism 14. In general, when actuating component 118 of shift control unit 84 is rotated to either the upshift position or the downshift position, then positioning unit interface plate 402 and support plate 406 pivot counterclockwise as shown in FIG. 9(B). This causes rotating member engaging member 394 to pivot clockwise around pivot shaft 410, since cam follower 414 is retained within cam slot 386, to the rotating member engaging position shown in FIG. 9(B). In this position, rotating member engaging surface 398 is disposed in the path of drive members 290, so one of the drive members 290 will contact rotating member engaging surface 398 as shown in FIG. 9(B) and cause rotating member engaging member 394 to rotate positioning unit interface plate 402 and support plate 406 clockwise against the biasing force of spring 420 as shown in FIG. 9(C). As crank arm 266 continues to rotate, the engaged drive member 290 will disengage from rotating member engaging member 394, rotating member engaging member 394 will pivot counterclockwise as shown in FIG. 9(D) back to the rotating member disengaging position, and spring 420 will cause positioning unit interface plate 402 and support plate 406 to pivot counterclockwise back to the position shown in FIG. 9(A).

Figure 10:
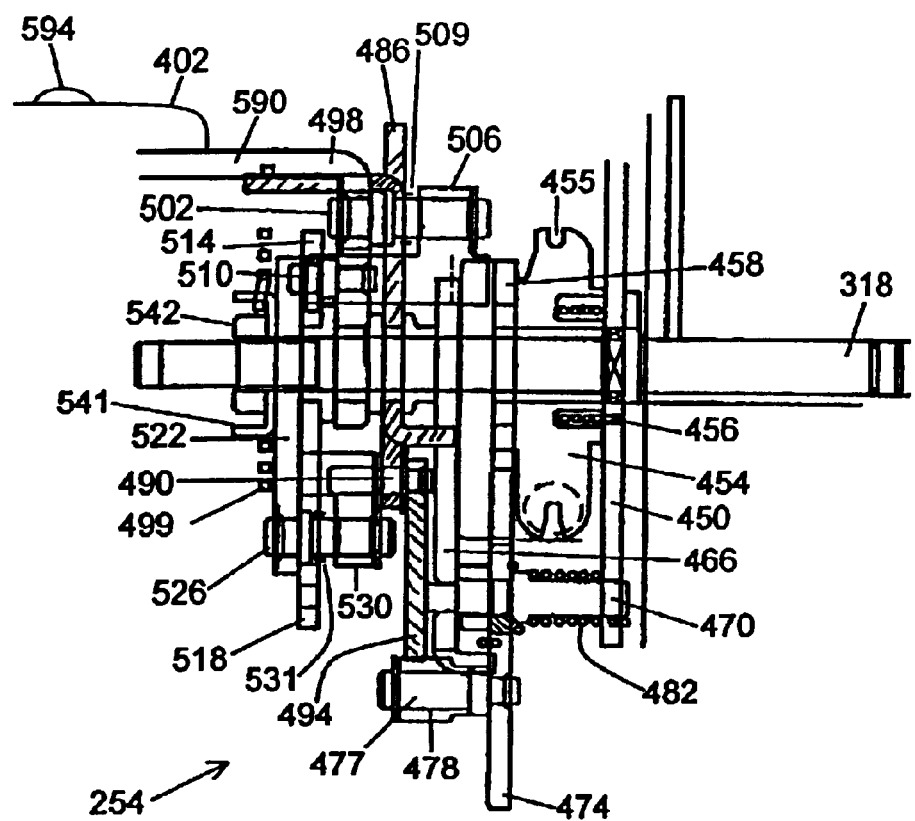
FIG. 10 is an enlarged cross sectional view of the internal components of the positioning unit shown in FIG. 8.

FIG. 10 is an enlarged rear cross sectional view of the internal components of positioning unit 254. As shown in FIG. 10, positioning unit 254 includes a base plate 450 supporting one end of a pawl shaft 470; an output transmission member in the form of a rotating member 454 rotatably supported on axle 318 and having a wire winding groove 455 for winding and unwinding output control wire 78 to a plurality of output positions; a biasing component in the form of a spring 456 for biasing rotating member 454 in a wire unwinding direction; a positioning member in the form of a positioning ratchet 458 coupled for integral rotation with rotating member 454; a middle plate 466 supporting the other end of pawl shaft 470; a position maintaining member in the form of a positioning pawl 474 supported by pawl shaft 470 for rotation between a position maintaining position and a position release position and having positioning teeth 475 and 476 (FIG. 15(A)); a pivot shaft 477 mounted to positioning tooth 475; a cam follower in the form of a cam roller 478 rotatably supported by pivot shaft 477; and a pawl spring 482 connected between positioning pawl 474 and base plate 450 for biasing positioning pawl 474 toward the position maintaining position (counterclockwise in FIG. 15(A)).

Positioning unit 254 further includes a release plate 486 rotatably supported on axle 318 and having a pivot shaft 490 supporting a cam member in the form of a cam plate 494; a motion transmitting member 498 rotatably supported on axle 318; a pawl shaft 502 mounted to motion transmitting member 498; a motion transmitting pawl 506 pivotably supported on pawl shaft 502; a spring 509 for biasing motion transmitting pawl 506 in the counterclockwise direction in FIG. 15(A); another pawl shaft 510 mounted to motion transmitting member 498; a mode change pawl 514 pivotably supported on pawl shaft 510; an input transmission member in the form of a control plate 518 rotatably supported on axle 318; a base plate 522; a pawl shaft 526 mounted to base plate 522 and supporting a switch-off drive control member in the form of a drive control pawl 530; a spring 531 for biasing drive control pawl 530 in the counterclockwise direction in FIG. 15(A); a pawl shaft 534 (FIG. 15(A)) mounted to base plate 522 and supporting a switch-on drive control member in the form of a drive control pawl 538; a spring 539 for biasing drive control pawl 538 in the counterclockwise direction in FIG. 15(A); a spring retainer 541; a spring 499 connected between spring retainer 541 and motion transmitting member 498 for biasing motion transmitting member 498 in the clockwise direction in FIG. 15(A), and a retaining nut 542 for axially retaining the components on axle 318. Base plate 450, base plate 522 and axle 318 function as mounting units for the various components.

Figure 11:
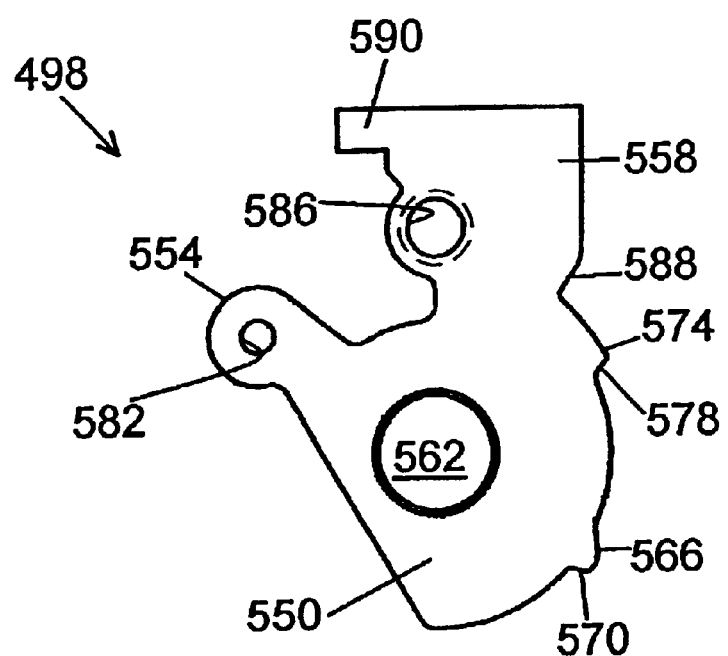
FIG. 11 is a side view of a particular embodiment of a motion transmitting member according to the present invention.

FIG. 11 is a side view of motion transmitting member 498. Motion transmitting member 498 includes a base portion 550, a pawl mounting ear 554 and a motion transmitting arm 558. Base portion 550 includes an opening 562 for receiving axle 318 therethrough, a radially outwardly extending projection 566 forming an abutment 570 for contacting drive control pawl 530, and a radially outwardly extending projection 574 forming an abutment 578 for contacting drive control pawl 538. Pawl mounting ear 554 includes an opening 582 for mounting pawl shaft 510 (which supports mode change pawl 514), and motion transmitting arm 558 likewise includes an opening 586 for mounting pawl shaft 502 (which supports motion transmitting pawl 506). Motion transmitting arm 558 also includes an abutment 588 for contacting drive control pawl 538, and an axially extending rotating member engaging unit interface plate 590 that attaches to positioning unit interface plate 402 through screws 594 as shown in FIGS. 8 and 10.

Figure 12:
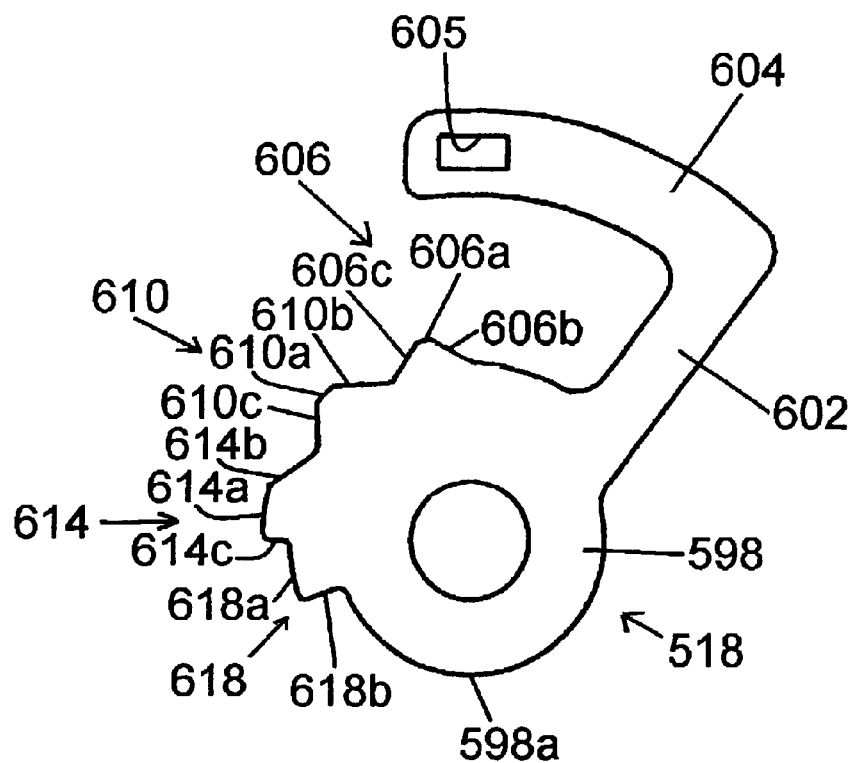
FIG. 12 is a side view of a particular embodiment of an input transmission member according to the present invention.

FIG. 12 is a side view of a particular embodiment of control plate 518. Control plate 518 includes an input control member in the form of a base portion 598, a lever arm portion 602, and an input unit interface plate 604. Input unit interface plate 604 includes an opening 605 for receiving coupling portion 362 (FIG. 6) of input link 306. Base portion 598 includes input control members in the form of radially extending drive control cam surfaces or lobes 606, 610, 614 and 618. Drive control cam lobe 606 includes an upper surface 606a and inclined ramps 606b and 606c. Similarly, cam lobe 610 includes an upper surface 610a and inclined ramps 610b and 610c. Cam lobe 614 includes an upper surface 614a, an inclined ramp 614b and a transition surface 614c extending from upper surface 614a to an upper surface 618a of cam lobe 618. Cam lobe 618 further includes a transition surface 618b extending from upper surface 618a to the outer peripheral surface 598a of base portion 598. It will become apparent from the description below that cam lobes 606, 610 and 614, drive control pawl 538 and motion transmitting member 498 with projection 578 comprise a switching mechanism to control the movement of rotating member engaging member 394 between the rotating member engaging position and the rotating member disengaging position.

Figure 13:
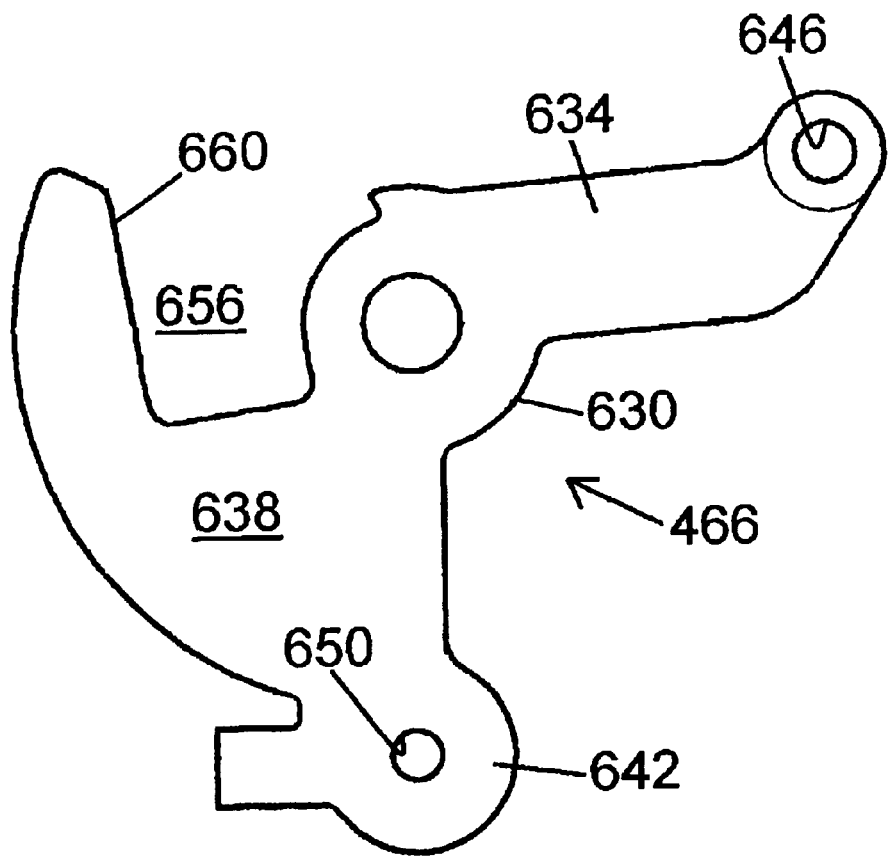
FIG. 13 is a side view of a particular embodiment of a middle plate according to the present invention.

FIG. 13 is a side view of a particular embodiment of middle plate 466. Middle plate 466 includes a base portion 630, a pawl coupling arm 634, a downshift control plate 638, and a pawl coupling portion 642 extending from downshift control plate 638. Pawl coupling arm 634 includes an opening 646 for receiving a fastener (not shown) used to attach the assembly to the housing, and pawl coupling portion 642 includes an opening 650 for attaching pawl shaft 470 (which supports positioning pawl 474). Downshift control plate 638 defines a recess 656 having a pawl control surface 660 that functions in a manner described below.

Figure 14:
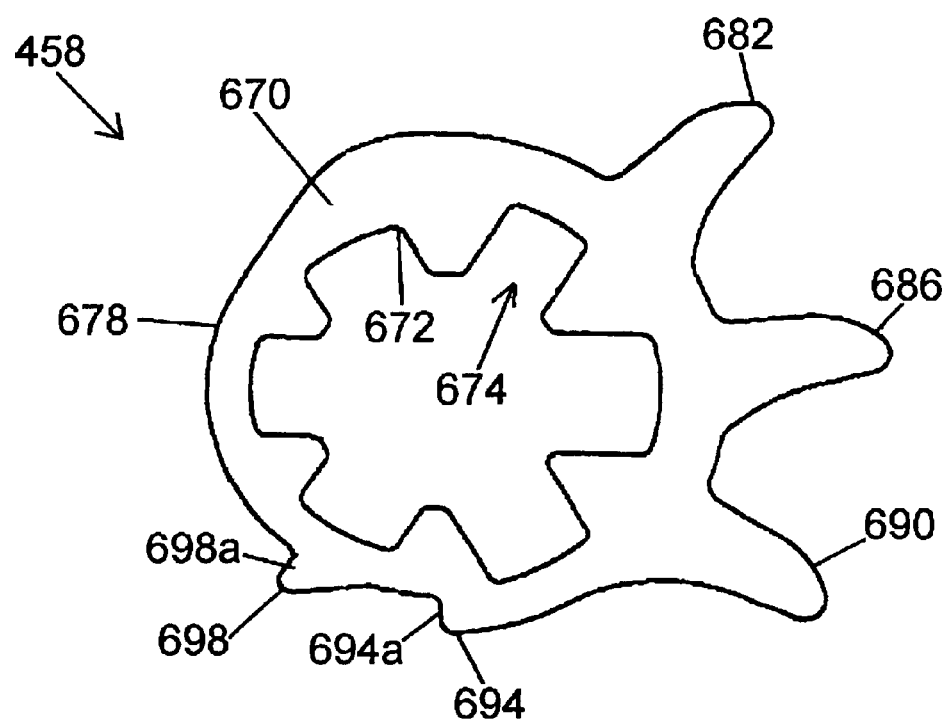
FIG. 14 is a side view of a particular embodiment of a positioning member according to the present invention.

FIG. 14 is a side view of positioning ratchet 458. Positioning ratchet 458 comprises a generally annular body 670 having an inner peripheral surface 672 forming a plurality of female splines 674 that nonrotatably engage a corresponding plurality of male splines (not shown) formed on rotating member 454 so that positioning ratchet 458 and rotating member 454 rotate as a unit. An outer peripheral surface 678 forms three positioning teeth 682, 686 and 690 and two drive teeth 694 and 698 defining drive surfaces 694a and 698a, respectively. With this structure, rotating member 454 can be set in three positions to accommodate three front sprockets 62. Such sprockets usually comprise a small diameter sprocket, an intermediate diameter sprocket, and a large diameter sprocket.

Figure 15:
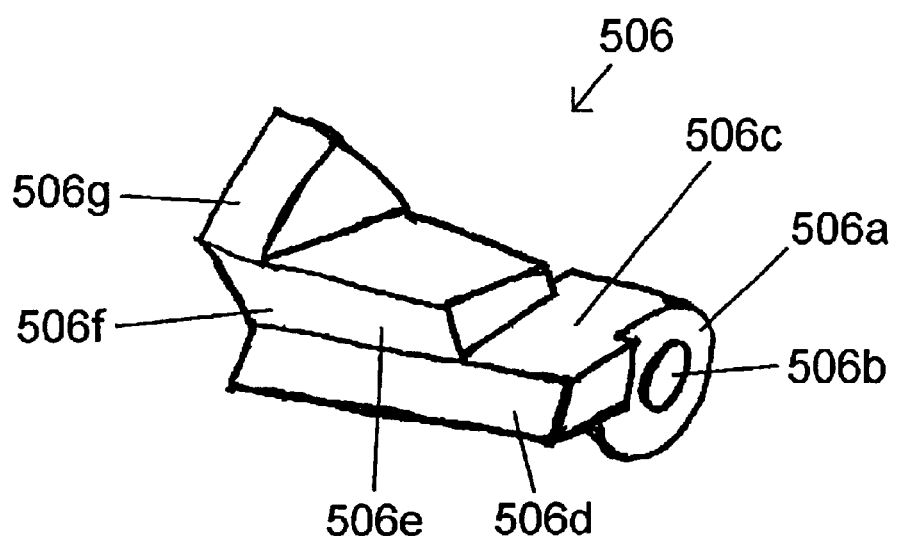
FIG. 15 is a perspective view of a particular embodiment of a motion transmitting pawl according to the present invention.

FIG. 15 is a perspective view of motion transmitting pawl 506. Motion transmitting pawl 506 includes a base portion 506a with an opening 506b for receiving pawl shaft 502, a downshift control surface 506c for contacting pawl control surface 660 of middle plate 466 in a manner described below, a positioning ratchet drive surface 506d, a release plate drive surface 506e, and mode change pawl contact surfaces 506f and 506g.

FIGS. 16(A)–(E) are views illustrating the operation of positioning unit 254 in an upshifting direction. In FIG. 16(A), positioning unit 254 is in a position such that front derailleur 70 is aligned with the small diameter front sprocket, and it is desired to move front derailleur 70 to the intermediate diameter front sprocket. In the position shown in FIG. 16(A), the tip of drive control pawl 530 is supported by the upper surface 606a of cam lobe 606, and the tip of drive control pawl 538 is located at the bottom of ramp 610c of cam lobe 610 such that drive control pawl 538 contacts abutment 578 on motion transmitting member 498 and holds motion transmitting member 498 in a "switch off" position. Thus, drive control pawl 538 and cam lobe 610 comprise a drive control mechanism that ordinarily maintains motion transmitting member 498 in the switch off position. Motion transmitting pawl 506 rests on the upper surface of drive tooth 694 on positioning ratchet 458.

The rider then rotates actuating component 118 counterclockwise (in FIG. 3) to the upshift position so that inner wire 80 is released by actuating component 118. This causes wire coupling member 302 to rotate clockwise in FIG. 6, and this motion is communicated via input link 306 to control plate 518 to rotate control plate 518 clockwise to the upshift position shown in FIG. 16(B). Clockwise rotation of control plate 518 causes drive control pawl 530 to slide down ramp 606c of cam lobe 606 and rotate counterclockwise to the position shown in FIG. 16(B). At the same time, drive control pawl 538 slides up ramp 614b of cam lobe 614 until drive control pawl 538 disengages from abutment 578 on motion transmitting member 498 and rests on upper surface 614a of cam lobe 614. Since drive control pawl 538 no longer contacts abutment 578, motion transmitting member 498 rotates clockwise until drive control pawl 538 contacts abutment 588, and motion transmitting member 498 is in a "switch on" position as shown in FIG. 16(B). Motion transmitting pawl 506, no longer being held by drive tooth 694 on positioning ratchet 458, rotates counterclockwise and rests on the outer peripheral surface 678 of positioning ratchet 458. The clockwise motion of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement is communicated to motion transmitting member 498. Positioning ratchet drive surface 506d of motion transmitting pawl 506 engages drive tooth 694 on positioning ratchet 458 and rotates positioning ratchet 458 and rotating member 454 to wind output control wire 78. During that time, positioning tooth 682 presses against pawl tooth 475 of positioning pawl 474 and rotates positioning pawl 474 clockwise until pawl tooth 475 clears the tip of positioning tooth 682. Then, positioning pawl 474 rotates counterclockwise so that pawl tooth 475 is located between positioning teeth 682 and 686 shown in FIG. 16(C).

When drive member 290 on crank arm 266 disengages from rotating member engaging member 394, positioning unit interface plate 402 and support plate 406 rotate back toward the position shown in FIG. 9(A), and this movement is communicated to motion transmitting member 498. Motion transmitting pawl 506 disengages from drive tooth 694 on positioning ratchet 458, and positioning ratchet 458 and rotating member 454 rotate clockwise in accordance with the biasing force of spring 456 until positioning tooth 682 abuts against pawl tooth 475. At this time, the front derailleur 70 is aligned with the intermediate diameter front sprocket as desired.

Assume, however, that at this time the rider has not yet rotated actuating component 118 back to the neutral position. In such a case, control plate 518 still would be in the upshift position with drive control pawl 538 resting on upper surface 614a of cam lobe 614. In this position, drive control pawl 538 would not be able to engage abutment 578 to stop the rotation of motion transmitting member 498. Thus, instead of returning to the switch off position shown in FIG. 16(A), motion transmitting member 498 would continue rotating to the switch on position shown in FIG. 16(B), rotating member engaging member 394 would return to the rotating member engaging position shown in FIG. 9(B), and another shift would result. Such an operation may be desirable in some applications and is within the scope of the present invention. However, in this embodiment drive control pawl 530 is provided to prevent such double shifts. More specifically, drive control pawl 530, having rotated counterclockwise as noted above, is now in the position to contact abutment 570 on motion transmitting member 498 and temporarily stop further rotation of motion transmitting member 498 so that motion transmitting member 498 is in the position shown in FIG. 16(D). Thus, drive control pawl 530 and cam lobe 606 comprise a drive control mechanism that inhibits rotation of motion transmitting member 498 back to the switch on position after the motion transmitting mechanism transmits motion from the rotating member engaging member 394 to rotating member 454.

When the rider returns actuating component 118 to the neutral position, control plate 518 likewise rotates back to the neutral position shown in FIG. 16(E). At that time, drive control pawl 530 slides up ramp 606c on cam lobe 606 and rotates clockwise until control pawl 530 disengages from abutment 570 on motion transmitting member 498 and the tip of control pawl 530 rests upon the upper surface 606a of cam lobe 606. Also, drive control pawl 538 slides down ramp 614b of cam lobe 614 and rotates counterclockwise so that the tip of drive control pawl 538 contacts abutment 578 on motion transmitting member 498 as shown in FIG. 16(E). Motion transmitting member 498 is now in the switch off position as shown originally in FIG. 16(A), but with positioning ratchet 458 and rotating member 454 in the position to align front derailleur 70 with the intermediate diameter front sprocket. The operation to shift from the intermediate diameter front sprocket to the large diameter front sprocket is the same.

FIGS. 17(A)–(E) are views illustrating the operation of positioning unit 254 in a downshifting direction. Some components are shown in transparent view to facilitate understanding of the operation of the components that play an important role in the downshift operation. Assume rotating member 454 is in a position such that front derailleur 70 is aligned with the intermediate diameter front sprocket (the same position shown in FIG. 16(E)), and it is desired to move front derailleur 70 to the small diameter sprocket. Accordingly, in the position shown in FIG. 17(A), the tip of drive control pawl 530 again is supported by the upper surface 606a of cam lobe 606, and the tip of drive control pawl 538 is located at the bottom of ramp 610c of cam lobe 610 such that drive control pawl 538 contacts abutment 578 on motion transmitting member 498. Motion transmitting pawl 506 rests on the upper surface of drive tooth 698 on positioning ratchet 458. Cam plate 494, which has the overall shape of a rounded and elongated isosceles triangle, includes an axially extending positioning tab 495 that abuts against a side surface 487 of release plate 486 to hold cam plate 494 in the position shown in FIG. 17(A).

The rider then rotates actuating component 118 clockwise (in FIG. 3) to the downshifted position so that inner wire 80 is pulled by actuating component 118. This causes wire coupling member 302 to rotate counterclockwise in FIG. 6, and this motion is communicated via input link 306 to control plate 518 to rotate control plate 518 counterclockwise as show in FIG. 17(B). Counterclockwise rotation of control plate 518 causes drive control pawl 530 to slide down ramp 606b of cam lobe 606 and rotate counterclockwise. At the same time, drive control pawl 538 slides up ramp 610c of cam lobe 610 and rotates clockwise until drive control pawl 538 disengages from abutment 578 on motion transmitting member 498 and rests on upper surface 610a of cam lobe 610. Since drive control pawl 538 no longer contacts abutment 578, motion transmitting member 498 rotates clockwise until drive control pawl 538 contacts abutment 588 and motion transmitting member 498 is in the switch on position shown in FIG. 17(B). This time, motion transmitting pawl 506 rotates clockwise by transition surface 618b of cam lobe 618, and mode change pawl 514 rotates clockwise to engage mode change pawl contact surface 506f on motion transmitting pawl 506 to temporarily hold motion transmitting pawl 506 in the position shown in FIG. 17(B). The movement of motion transmitting member 498 is communicated to positioning unit interface plate 402 and support plate 406 in rotating member engaging unit 258 so that rotating member engaging member 394 pivots to the position shown in FIG. 9(B).

When drive member 290 on crank arm 266 engages rotating member engaging member 394 and pivots positioning unit interface plate 402 and support plate 406 to the position shown in FIG. 9(C), the movement again is communicated to motion transmitting member 498, but this time release plate drive surface 506e of motion transmitting pawl 506 engages an abutment 487 on release plate 486 (which is currently in a first release member position), and release plate 486 rotates counterclockwise as shown in FIG. 17(C). Thus, motion transmitting member 498 functions as a release drive member for release plate 486 in this mode. As release plate 486 rotates, a base surface 496 of cam plate 494 contacts cam roller 478 attached to positioning pawl 474 and causes positioning pawl 474 to rotate in the clockwise direction. When the tip of pawl tooth 475 clears the tip of positioning tooth 682, positioning ratchet 458 and rotating member 454 rotate in the clockwise direction in accordance with the biasing force of spring 456 until positioning tooth 686 abuts against pawl tooth 476 to prevent uncontrolled rotation of positioning ratchet 458 and rotating member 454.

As release plate 486 continues to rotate counterclockwise toward a second release member position (the end of the range of motion of release plate 486), cam roller 478 reaches the rounded corner or cam lobe 497 of cam plate 494, thus causing cam plate 494 to rotate in the counterclockwise direction as shown in FIG. 17(C). This, in turn, allows positioning pawl 474 to rotate in the counterclockwise direction so that pawl tooth 476 moves away from positioning tooth 686 to allow positioning ratchet 458 and rotating member 454 to continue rotating in the clockwise direction until rotating member 454 is positioned so that front derailleur 70 is aligned with the smaller diameter sprocket.

If this system operated according to known systems which use a positioning pawl and positioning ratchet to control the shifting operation, the pawl tooth 476 would remain engaged with positioning tooth 686 until release plate 486 reversed direction (i.e., rotated in the clockwise direction) to complete the shifting operation. This is not necessary with a shift control mechanism constructed according to the present invention, since the rotatable cam plate 494 allows the positioning pawl 474 to immediately complete the shifting operation even when release plate 486 is still rotating in the counterclockwise direction. Thus, release plate 486 and cam plate 494 can be considered a release control mechanism that moves positioning pawl 474 to the position release position as release plate 486 moves toward the second release member position and allows positioning pawl 474 to return to the position maintaining position as release plate 486 continues to move toward the second release member position.

Figure 18A:
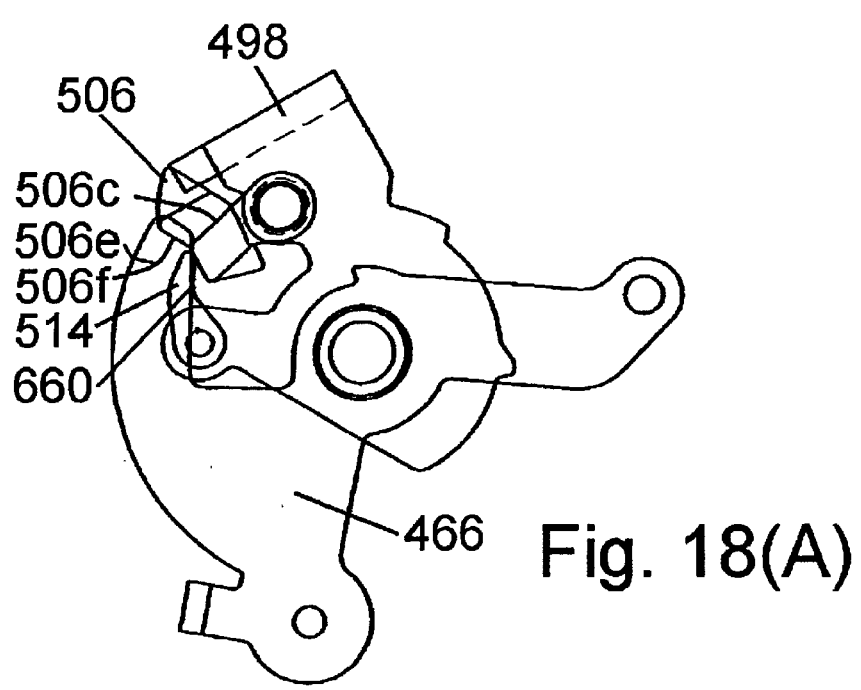
FIGS. 18(A) and 18(B) are views illustrating the cooperation of the motion transmitting pawl with the middle plate during a downshifting operation.
Figure 18B:
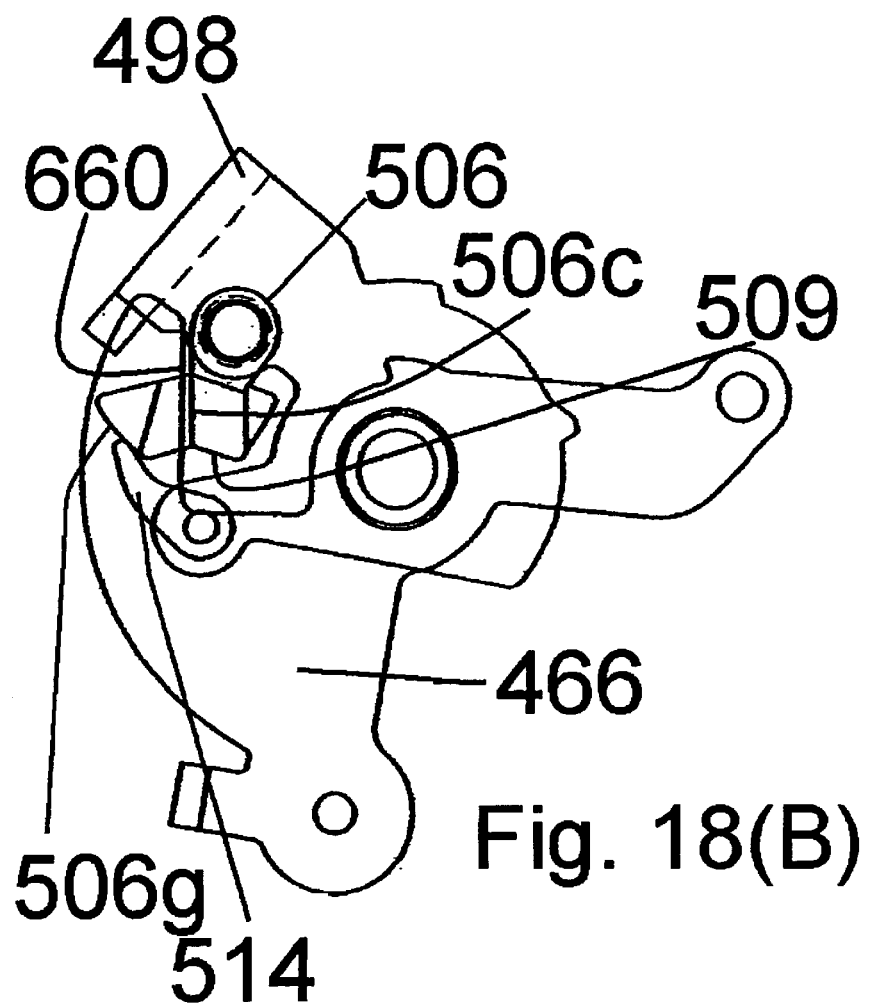

Another advantageous feature of the preferred embodiment is the manner in which the release plate 486 is allowed to reverse direction even when motion transmitting member 498 is still rotating in the counterclockwise direction. According to the preferred embodiment, when the motion transmitting member 498 is located in the position shown in FIGS. 17(C) and 18(A), downshift control surface 506c of motion transmitting pawl 506 begins to contact the pawl control surface 660 of middle plate 466 as shown in FIG. 18(A). Further rotation of motion transmitting member 498 causes motion transmitting pawl 506 to rotate counterclockwise as shown in FIGS. 17(D) and 18(B) which, in turn, causes motion transmitting pawl 506 to disengage from release plate 486. Mode change pawl 514 also disengages from mode change pawl contact surface 506f of motion transmitting pawl 506 and rests on mode change pawl contact surface 506g. Consequently, release plate 486 is allowed to return immediately to the position shown in FIG. 17(D), even when motion transmitting member 498 is still in the counterclockwise position shown in FIG. 17D).

When drive member 290 on crank arm 266 disengages from rotating member engaging member 394, positioning unit interface plate 402 and support plate 406 again rotate back toward the position shown in FIG. 9(A), and this movement is communicated to motion transmitting member 498. Once again, assume that the rider has not yet rotated actuating component 118 back to the neutral position. In such a case, control plate 518 is still in the downshift position with drive control pawl 538 resting on upper surface 610a of cam lobe 610, but drive control pawl 530 contacts abutment 570 on motion transmitting member 498 so that motion transmitting member 498 is in the pause position shown in FIG. 17(E).

When the rider returns actuating component 118 to the neutral position, control plate 518 likewise rotates clockwise back to the neutral position shown in FIG. 17(F). At that time, drive control pawl 530 slides up ramp 606b of cam lobe 606 and rotates clockwise until drive control pawl 530 disengages from abutment 570 on motion transmitting member 498 and the tip of drive control pawl 530 rests upon upper surface 606a of cam lobe 606. At the same time, drive control pawl 538 slides down ramp 610c of cam lobe 610 and rotates counterclockwise so that the tip of drive control pawl 538 contacts abutment 578 on motion transmitting member 498 as shown in FIG. 17(F). Motion transmitting member 498 is now in the switch off position originally shown in FIG. 17(A), but positioning ratchet 458 and rotating member 454 are in the position to align front derailleur 70 with the small diameter front sprocket.

The operation to shift from the large diameter front sprocket to the intermediate diameter front sprocket is the same. However, in this case positioning ratchet 458 would be positioned initially such that pawl tooth 475 abuts against positioning tooth 686. As positioning pawl 474 rotates clockwise in response to pressure from cam plate 494, pawl tooth 475 clears positioning tooth 686, and positioning ratchet 458 rotates counterclockwise until positioning tooth 690 contacts pawl tooth 476. When positioning pawl 474 rotates counterclockwise as the cam lobe 497 of cam plate 494 reaches cam roller 478, pawl tooth 475 enters the space between positioning teeth 682 and 686, and pawl tooth 476 releases positioning tooth 690 so that positioning ratchet 458 and rotating member 454 rotate clockwise until positioning tooth 682 contacts pawl tooth 475, thus maintaining positioning ratchet 458 and rotatable member 454 in the position shown in FIG. 17(A).

While the above is a description of various embodiments of the present invention, further modifications may be employed without departing from the spirit and scope of the present invention. For example, while separately operated drive control pawls 530 and 538 were provided in the preferred embodiment, the embodiment shown in FIGS. 19(A) and 19(B) show a single drive control pawl 700 with pawl teeth 704 and 708. Pawl tooth 704 contacts abutment 578 on motion transmitting member 498 when motion transmitting member 498 is in the home position as shown in FIG. 19(A). Pawl tooth 708 contacts abutment 570 on motion transmitting member 498 when motion transmitting member 498 is rotating clockwise to the switch off position and control plate 486 has not yet rotated to the neutral position as shown in FIG. 19(B).

Figure 20:
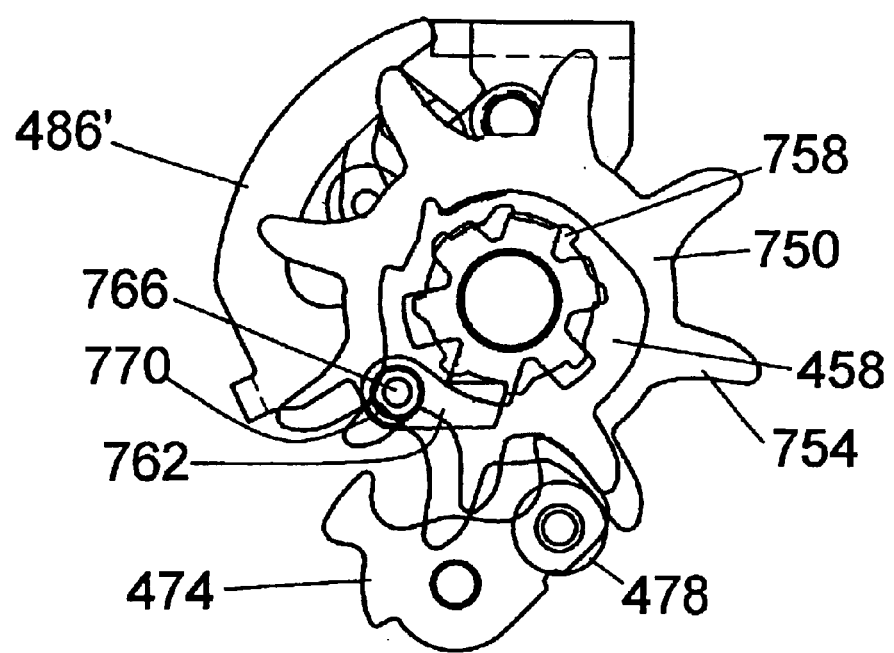
FIG. 20 is a side view of an alternative embodiment of a release mechanism according to the present invention.

While a cam plate 494 was used to control positioning pawl 474 in a downshifting operation in the preferred embodiment, FIG. 20 shows an embodiment wherein a cam wheel 750 controls the operation of positioning pawl 474. In this embodiment, cam wheel 750 is coaxially and rotatably mounted relative to positioning ratchet 458. Cam wheel 750 includes a plurality of circumferentially disposed cam teeth 754 and a plurality of circumferentially disposed cam drive teeth 758. A cam drive pawl 762 is pivotably mounted to a release plate 486' through a pivot shaft 766 and biased in a counterclockwise direction by a spring 770. When release plate 486' rotates in the counterclockwise direction during a downshift operation, cam drive pawl 762 engages one of the plurality of cam drive teeth 758 and rotates cam wheel 750 in the counterclockwise direction. One of the plurality of cam teeth 754 presses against cam roller 478 and causes positioning pawl 474 to rotate in the clockwise direction in the same manner as in the preferred embodiment. When the cam tooth 754 passes cam roller 478, positioning pawl 474 rotates in the counterclockwise direction to complete the downshift operation. Cam drive pawl 762 disengages from the corresponding cam drive tooth 758 when release plate 486' rotates in the clockwise direction.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A shift control device for controlling a transmission control member coupled to a bicycle transmission, wherein the device comprises:

an actuating component that is manually operated by a rider, wherein the actuating component moves to an actuating component neutral position, to an actuating component upshift position and to an actuating component downshift position;

a first biasing component that biases the actuating component toward one of the actuating component upshift position and the actuating component downshift position when the actuating component is in the actuating component neutral position;

a neutral positioning component that resists the biasing of the actuating component toward the one of the actuating component upshift position and the actuating component downshift position to thereby position the actuating component in the actuating component neutral position; and a transmission control member coupling component adapted to couple the transmission control member to the actuating component such that the transmission control member moves to a transmission control member neutral position when the actuating component moves to the actuating component neutral position, to a transmission control member upshift position when the actuating component moves to the actuating component upshift position, and to a transmission control member downshift position when the actuating component moves to the actuating component downshift position.

2. The device according to claim 1 wherein the neutral positioning component comprises a second biasing component that biases the actuating component toward the other one of the actuating component upshift position and the actuating component downshift position.

3. The device according to claim 2 wherein the actuating component comprises a lever.

4. The device according to claim 1 wherein the actuating component comprises an arcuate member adapted to move coaxially relative to a bicycle handlebar.

5. The device according to claim 4 wherein the actuating component comprises a tubular member.

6. The device according to claim 5 wherein the transmission control member coupling component is adapted to couple the transmission control member to the actuating component so that the transmission control member moves integrally with the actuating component.

7. The device according to claim 5 wherein the actuating component further comprises a first finger projection extending radially outwardly from the tubular member.

8. The device according to claim 7 wherein the actuating component further comprises a second finger projection extending radially outwardly from the tubular member.

9. The device according to claim 1 wherein the neutral positioning component comprises a stopper for stopping movement of the actuating component toward one of the actuating component upshift position and the actuating component downshift position.

10. The device according to claim 1 further comprising a base member, wherein the actuating component is rotatably supported relative to the base member.

11. The device according to claim 10 wherein the first biasing component is coupled between the actuating component and the base member.

12. The device according to claim 11 wherein the first biasing component comprises a spring.

13. The device according to claim 10 further comprising an intermediate member rotatably supported relative to the base member.

14. The device according to claim 13 further comprising:
a projection disposed on one of the base member and the intermediate member;
first and second abutments disposed on the other one of the base member and the intermediate member;
wherein the projection is disposed between the first and second abutments for limiting rotation of the intermediate member relative to the base member; and
wherein the neutral positioning component comprises at least one of the projection, the first abutment and the second abutment.

15. The device according to claim 13 wherein the neutral positioning component comprises a stopper for stopping movement of the actuating component toward one of the actuating component upshift position and the actuating component downshift position.

16. The device according to claim 15 wherein the stopper comprises a base member stopper coupled to the base member.

17. The device according to claim 16 further comprising an intermediate member stopper coupled to the intermediate member, wherein the intermediate member stopper engages the base member stopper for limiting rotation of the intermediate member relative to the base member.

18. The device according to claim 17 wherein the first biasing component is mounted between the intermediate member and the base member.

19. The device according to claim 18 wherein the intermediate member includes an intermediate member bias engaging component for engaging the first biasing component, and wherein the base member includes a base member bias engaging component for engaging the first biasing component.

20. The device according to claim 19 wherein the first biasing component comprises a spring.

21. The device according to claim 13 wherein the actuating component is rotatably supported relative to the intermediate member.

22. The device according to claim 21 wherein the neutral positioning component comprises:
an actuating component stopper coupled to the actuating component;
a first intermediate member stopper coupled to the intermediate member; and
wherein the actuating component stopper is adapted to engage the first intermediate member stopper to limit rotation of the actuating component relative to the intermediate member.

23. The device according to claim 22 wherein the neutral positioning component further comprises:
a base member stopper coupled to the base member,
a second intermediate member stopper coupled to the intermediate member; and
wherein the second intermediate member stopper engages the base member stopper for limiting rotation of the intermediate member relative to the base member.

24. The device according to claim 23 wherein the first biasing component is mounted between the intermediate member and the base member.

25. The device according to claim 24 wherein the intermediate member includes an intermediate member bias engaging component for engaging the first biasing component, and wherein the base member includes a base member bias engaging component for engaging the first biasing component.

26. The device according to claim 25 wherein the first biasing component comprises a spring.

27. The device according to claim 13 further comprising:
a first projection disposed on one of the actuating component and the intermediate member;
first and second abutments disposed on the other one of the actuating component and the intermediate member;
wherein the first projection is disposed between the first and second abutments for limiting rotation of the actuating component relative to the intermediate member;
a second projection disposed on one of the base member and the intermediate member,
third and fourth abutments disposed on the other one of the base member and the intermediate member;
wherein the second projection is disposed between the third and fourth abutments for limiting rotation of the intermediate member relative to the base member; and
wherein the neutral positioning component comprises the first projection, the second projection, at least one of the first abutment and the second abutment, and at least one of the third abutment and the fourth abutment.

28. The device according to claim 27 wherein the intermediate member includes an intermediate member bias engaging component for engaging the first biasing component, and wherein the base member includes a base member bias engaging component for engaging the first biasing component.

29. The device according to claim 28 wherein the first biasing component comprises a spring.

30. The device according to claim 29 wherein the transmission control member coupling component is adapted to couple the transmission control member to the actuating component so that the transmission control member moves integrally with the actuating component.

* * * * *